June 17, 1952 E. B. HALES 2,600,868

COLOR TELEVISION RECORDING APPARATUS

Filed June 29, 1950 2 SHEETS—SHEET 1

Inventor
EVERETT B. HALES

By H. L. Mackey
Attorney

June 17, 1952 E. B. HALES 2,600,868

COLOR TELEVISION RECORDING APPARATUS

Filed June 29, 1950 2 SHEETS—SHEET 2

Inventor
EVERETT B. HALES

By

H. A. Mackey

Attorney

Patented June 17, 1952

2,600,868

UNITED STATES PATENT OFFICE 2,600,868

COLOR TELEVISION RECORDING APPARATUS

Everett B. Hales, Mount Kisco, N. Y., assignor to General Precision Laboratory Incorporated, a corporation of New York Application June 29, 1950, Serial No. 171,149

12 Claims. (Cl. 178—5.4)

This invention pertains to the recording of color television pictures, and particularly to an apparatus for recording such television images on an intermittently advanced motion picture strip of the lenticular type.

One method which has been suggested for displaying television pictures on a large screen where they may be viewed by a sizable audience consists of the so-called intermediate film process. In this process the television images are received in the usual manner and displayed on a relatively small cathode ray tube screen. The image so displayed on this small screen is then projected on a motion picture film strip contained in a camera mechanism, the camera and television receiver being so mutually controlled that the transmitted television images are converted to photographic images at the standard number of motion picture frames, i. e., 24 frames per second. Such a process enables the images formed on the motion picture strip to be projected by standard projection apparatus using large amounts of light so that the projected images may be enlarged many times and still retain adequate screen brightness for satisfactory viewing. Such a process when combined with rapid development of the film strip permits television pictures to be displayed with a negligible lapse of time and likewise since the images are recorded on a film strip proper programming of a theater bill is permitted regardless of the time when the television pictures were actually transmitted. For example, a news item or other feature of particular interest may be received by television transmission, recorded and held for projection until the showing of the feature picture is completed or there is some other definite break in the regular theater program. Likewise it will of course be obvious that the use of an intermediate film process enables a previously transmitted television program to be repeatedly projected as often as desired and thus a transitory television signal may be converted into a permanent record which can be included as a regular recurrent part of a theater program.

Thus the intermediate film process offers the advantages of permitting projection by standard apparatus at adequate light levels and of providing a permanent record which may be shown at any time and such showings repeated for subsequent audiences at will.

Various systems of this type have been developed for recording black and white television images, but no such system has been available for use with color television images.

A purpose of the present system therefore is to supply this lack and provide a system wherein color television images transmitted as successive fields of light intensity representative of the intensities of the various colors comprising the image are recorded on a motion picture film strip for immediate and/or subsequent projection in full color.

In general, this purpose is accomplished by providing a motion picture camera containing a lenticular film strip as the photographically sensitive material. Received television images depicted on the screen of a cathode ray tube as successive fields whose light intensities are representative of the light intensities of the various primary colors which make up the object televised are projected on the film strip through the medium of a suitable optical system and a movable mask interposed between the cathode ray tube screen and the film strip. The movable mask is provided with a series of apertures so arranged that the successive fields of scan representive of the light intensities of different colors are projected on the film strip as separate positionally displayed beams thus insuring that displaced areas of the emulsion of the lenticular film are separately affected by the separate color representative television fields.

Likewise, as an additional feature synchronizing equipment is provided to coordinate the movements of the mask and the periodic advance of the film strip with the synchronizing pulses of the received television signal so that a light image is not impressed on the film strip during the short periods of time during which it is advanced and the proper aperture of the mask is always positioned in the correct location to direct the beams of light of the color representative television fields in the desired directions.

The nature of this invention will be better understood from the detailed description and accompanying drawings, in which.

Figure 1:
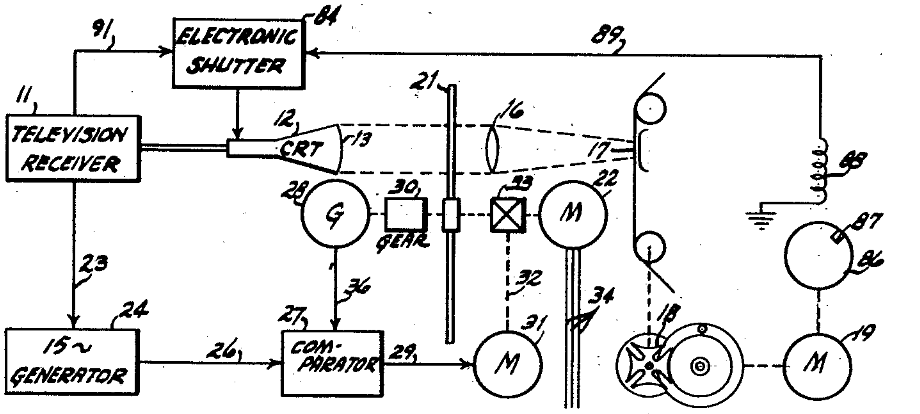
Figure 1 is a schematic illustration of the apparatus of the invention.

Referring now to Fig. 1, a television receiver 11 incorporating a picture tube or cathode ray tube 12 having a screen 13 is actuated by received color television signals. These signals consist of three consecutive color fields or complete vertical scans. The fields represent intensities in the object televised of the colors red, green and blue, in that order. The number of lines per field and the field frequency may be of any desired values, but for the purpose of illustration each field consists of 600 non-interlaced horizontal lines or scans and each field has a duration of $\frac{1}{120}$ second, so that the time duration or period of the three fields constituting a single television picture is $\frac{1}{40}$ second. Immediately upon the completion of one television picture another picture commences, so that 40 complete pictures consisting of 120 color fields are received in each second. This is graphically illustrated in the upper part of Fig. 2, in which the abscissae represent time and ordinates represent intensity of the received television signal. Superimposed on the picture signal are the usual vertical and horizontal synchronizing pulses, the vertical pulses being shown at the reference numerals 14 but the horizontal pulses not being shown because of the small scale of the figure.

In Fig. 1 the actinic radiation of the screen 13 is directed to the optical system of a motion picture camera, represented by a lens 16, which is focussed upon a lenticular motion picture film 17. The film is advanced by an intermittent mechanism 18 driven by a motor 19 at the standard rate of 24 frames per second, so that the film after processing can be shown in standard sound film projectors.

A rotating mask 21 is positioned in the optical system as close as possible to one of the objective nodal planes thereof. This mask may have various forms, but whatever its form its function is to divide the beam of light directed by the optical system upon the film 17 into several bands, approximately transverse of the film strip, corresponding to the three primary colors red, green and blue. The mask is rotated by a synchronous driving motor 22 energized from power mains 34 and rotated at a speed of 40 revolutions per second in phase with the received television signals by a method and means fully described in the copending application Serial No. 62,872, of Garman et al., filed December 1, 1948, and briefly described as follows.

The vertical synchronizing signals having a frequency of 120 cycles per second are transmitted from the synchronizing signal separation circuit of the television receiver through conductors 23 to a 15-cycle generator 24. Here the signals are amplified and from them there is derived through the medium of a succession of three scale-of-two multivibrator circuits a signal having a frequency of one-eighth of 120 cycles per second or 15 C. P. S. Any other desired frequency not greater than 40 C. P. S. may be selected and derived instead, if desired. This signal is transmitted through conductors 26 to a comparator 27. A generator 28 is rotated through a reduction gear 30 from the motor 22 that drives the mask 21 and has an alternating current output which, when the mask has the correct speed, is of the same frequency as the output of the 15-cycle generator 24. In addition, when the mask 21 is correctly phased in relation to the television receiver the phase of the output voltage of the generator 28 bears a specific relation to the phase of the output voltage of the generator 24. The comparator 27 has an electrical output voltage which, through conductors 29, is applied to control the direction and speed of rotation of a correction motor 31. The shaft 32 of this motor is connected to the drive shaft of the mask 21 through a differential gear 33, so that its speed is algebraically added to the speed imparted to the mask by its driving motor 22.

Figure 2:
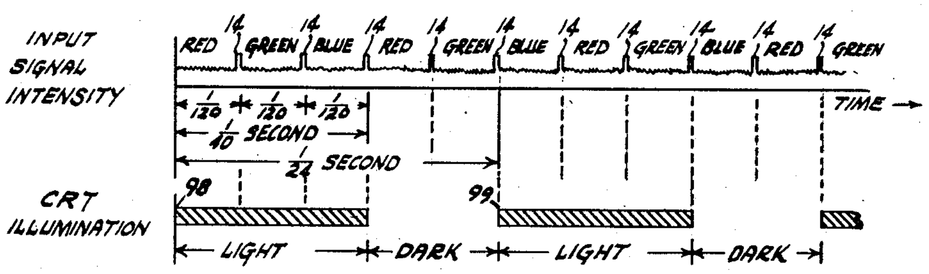
Figure 2 is a graphic illustration of the signal time relations involved in the practice of the invention.
Figure 3:
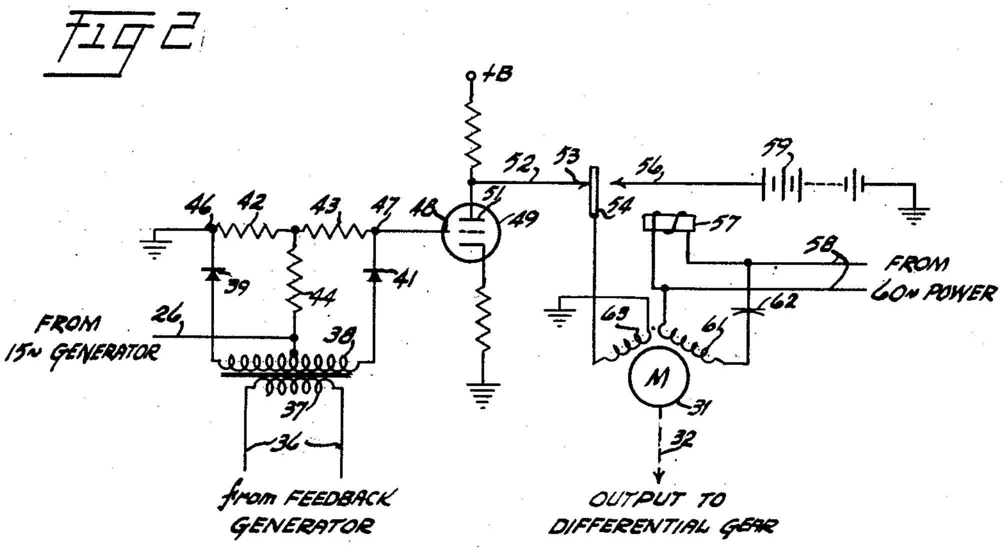
Figure 3 is a schematic illustration of a comparator circuit used in connection with the circuit of Fig. 1.

The comparator 27 is shown in greater detail in Fig. 3. The alternating voltage of the feedback generator 28, Fig. 1, is applied through conductors 36, Fig. 3, to the primary winding 37 of a transformer. The secondary winding 38 thereof is connected to two rectifiers 39 and 41 and the circuit is completed through two equal resistors 42 and 43, the junction of which is connected through a resistor 44 to the midtap of the secondary winding. Equal and opposite direct currents therefore flow in the resistors 42 and 43 on alternate half cycles of induced potential, and the terminal 47 is thereof maintained at the same potential as that of 46, namely ground, in this instance. The 15-cycle potential from the generator 24, Fig. 1, is applied through conductor 26, Fig. 2, to the transformer center tap, and if these 15-cycle alternations are of one phase relation, they will, during their positive half cycles, aid the current flow through the rectifier 39 and thus increase the drop of potential in the resistor 42, but if of the opposite phase will aid current flow through the rectifier 41 and will increase the potential drop in the resistor 43. If the phase of the voltage in conductor 26 has an intermediate value, the potential drops in the resistors 42 and 43 will be affected equally. If the potential drop in resistor 42 is greater than that in resistor 43, the net effect is to depress the potential of the terminal 47 below that of ground, while if the drop in 43 is greater than in 42, the terminal 47 potential is raised above ground. As a result, the control grid 48 of a triode 49 connected to the terminal 47 will be given a positive, negative, or zero net direct current potential bias relative to ground in accordance with the phase of the voltage of the conductor 26 in relation to the phase of the voltage of the conductors 36, and the potential of the anode 51, conductor 52 and contact 53 will be varied accordingly. The device thus sensitively detects and senses phase differences.

A polarized armature 54 is vibrated between two contacts 53 and 56 by a solenoid 57 connected to any convenient source of alternating current such as 60-cycle power at conductors 58. The contact 56 is energized by a battery 59 having a potential equal to the no-signal potential of the contact 53. The armature 54, being alternately excited by the potentials of the fixed contacts, attains a 60-cycle potential which is of zero amount when the potentials of the contacts 53 and 56 are equal, and is of sensible amount otherwise, the phase being dependent upon the voltage relations of the contacts to each other. The correction motor 31 is of the two-phase type, having one field winding 61 connected in series with a quadrature condenser across the power supply conductors 58. The other field winding 63 is connected to the armature 54. Consequently the phase of the voltage applied to field 63 either leads or lags the phase of the field applied to field 61, depending upon the phase relation of the voltage upon contact 53 with the voltage actuating the solenoid 57, and the motor 31 runs forward or backward accordingly and at a speed related to the magnitude of the voltage difference of the contacts. The motor shaft 32 is connected to modify the speed of the mask 21, as mentioned, and in such sense as to tend to bring the feedback signal at conductors 36 into such phase relative to the signal on conductor 26 as to make the frequencies equal and the phase of the mask correct.

The mask phase as described will, however, be correct only relative to the color field period, and not relative to the television picture period. That is, when the red-transmitting band of the mask is in place for transmitting the red field, either a red, green, or blue field may be in exhibition upon the cathode ray tube screen. Since there is assumed to be absence of any picture keying signal in the received signals, it will be necessary for the operator, at the beginning of the intermediate film operation, to phase the mask 21 with the proper color field manually. This may be done by momentary interruption of power to the mask motor, until the product of the intermediate film processes attains correct color values.

Figures 4A, 4B:
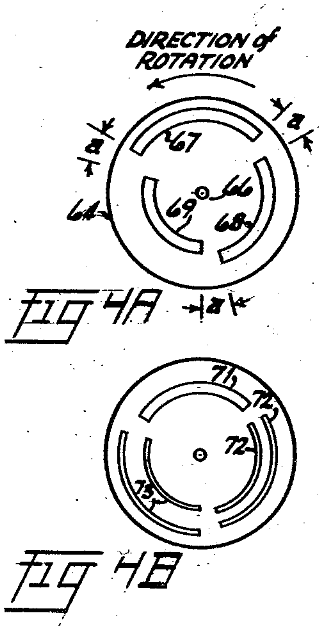
Figures 4A and 4B illustrate mask designs used in carrying out the purposes of the invention.

A simple form of the mask 21, Fig. 1, is illustrated in Fig. 4A. It consists of a disc 64 designed for rotation about its axis by a shaft 66. The disc contains three circumferential slots 67, 68 and 69 of equal length, each being open or transparent to the actinic light of the screen 13, Fig. 1, the band of light transmitted through or passed by the slot 67, Fig. 4A, corresponding to red in the televised object, that passed by the slot 68 to green and that passed by the slot 69 to blue. An angular distance *a* is left between the ends of the slots to avoid color mixing, its magnitude being dependent upon the aperture diameter of the optical system 16, Fig. 1, and upon the persistence of the phosphor composing the screen 13. To enhance the efficiency of the duty cycle of the mask short persistence phosphors should be employed. As an illustration, let it be assumed that the angle *a*, Fig. 4A, is 15°, the length of each slot is then 105°. The slot widths are together equal to the diameter of the aperture of the optical system 16, Fig. 1.

A slightly more complex form of mask having five slots is illustrated in Fig. 4B. In this form a center slot 71 of approximately double width is provided for transmitting red intensities and at greater and less radial distances from the axis are provided two single-width slots 72 for transmitting green intensities, and at still greater and less radial distances are provided two single-width slots 73 for transmitting blue intensities. The resolution required of the film with this form of mask is about twice that required with the simpler mask, but with such a mask a better color balance is attained. The optimum relative widths of the slots are affected by the color sensitivity of the eye, by the relative transmission of the colors, and by the spectral sensitivity of the lenticular film employed, but an approximate color balance is secured by making the slots 67, 68 and 69 of Fig. 4A of equal width and by making the red slot 71 of Fig. 4B of double the widths of each of the green slots 72 and blue slots 73.

Figure 5:
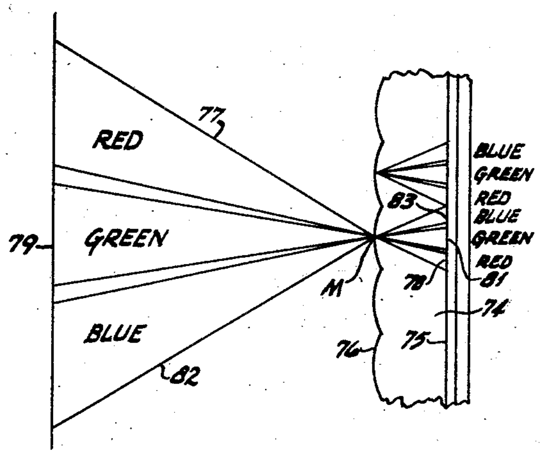
Figures 5 and 6 illustrate some of the principles of lenticular color photography as they apply to this invention.

The process by which the mask 21, Fig. 1, applies separate light intensities proportional to the primary colors to the lenticular film 17 requires an understanding of the principles of lenticular film. In Fig. 5 there is shown a longitudinal section 74 of a lenticular film, greatly enlarged. The front surface of the film contains transverse ridges constituting cylindrical lenses 76, each having a dimension lengthwise of the film of $\frac{1}{25}$ mm. The front surface of the emulsion is represented at 75 and is at the focal distance of the lens surfaces 76, although only a few thousandths of an inch away. Now assume a cone of light 77 representing red intensity focussed upon a point M in the surface 76. The cylindrical lens surface will image it at a small area 78 in the emulsion. Likewise a second cone of light 79 representing green intensity and focussed upon the same point M is imaged at a different area 81 in the emulsion, and a third cone 82 is imaged at 83. These three images substantially fill the space behind one film lens or corrugation.

Figure 6:
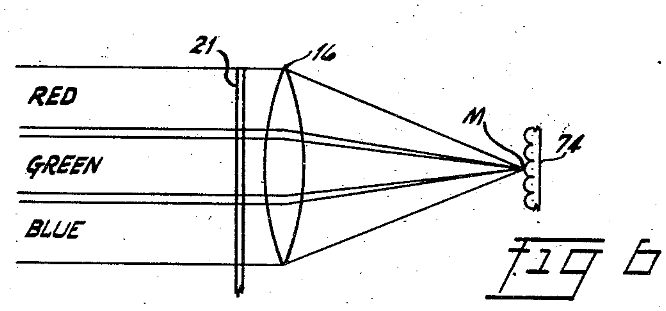

Fig. 6 represents a section through the lens 16 and mask 21 of Fig. 1, and a lenticular film 74 at the focus of the lens 16. Let it be assumed that an instant of time be chosen during which the black and white display on the screen 13, Fig. 1, represents the intensities of the color red throughout the object being televised. These intensities of light are transmitted toward the lens 16, but at this instant the mask 21 is in such phase that only the red slot thereof is open, exposing only the upper third of the lens 16 to light. The distance between the screen 13, Fig. 1, and the lens 16 is great enough so that substantially parallel rays enter the lens 16, and an image of one point of the object is erected at the focal point M on the lenticular film. Considering that the lenticular lenses are cylinders and considering the entire lens 16 rather than the cross-section illustrated in Fig. 6, it is obvious that a horizontal line element of the object is erected as an image in the film, and is focussed on the emulsion thereof. Similarly lines of light representing the green intensity are focussed on the emulsion an instant later when a field representing green is displayed on the screen 13, the mask 21 simultaneously presenting its green slot to expose only the middle portion of the lens to the beam G, Fig. 6. Likewise during the field of light representing blue intensity the beam B is permited by the mask 21 to illuminate the lens 16 and produces lines on the film emulsion. These operations occur during the length of time of a single complete television picture composed of three color fields, of $\frac{1}{40}$ second, and impress upon the lenticular film separate lines representing all area elements of the object in each of the three primary color intensities.

The film may now be developed in the usual manner to form negative film. This film can be employed in projection printing apparatus similar optically to that just described to prepare positive film, which can be projected by the employment of a lens similar to the lens 16 and a three-color filter in place of the slotted mask 21; the process being conventional, to form colored motion pictures on a theater viewing screen. As an alternative a reversing circuit can be added to the television receiver 11, Fig. 1, consisting essentially of one stage of electronic amplification and inversion and a circuit for suppressing the vertical and horizontal flyback lines, in a manner well understood in the art. The lenticular film will then contain positive images and after development can be projected without additional operations.

Returning now to Fig. 1, it is necessary by some means to reconcile the $\frac{1}{40}$ second duration of the television picture with the $\frac{1}{24}$ second motion picture frame period, to prevent part of the television picture from being lost during motion picture pull-down, as well as to secure proper exposure of all parts of the motion picture by exposing each motion picture film frame to all of all three color fields and to no more. This is accomplished by means of a camera signal generated once each motion picture frame, and by an electronic shutter 84. The apparatus for accomplishing these results is fully explained in the copending application Serial No. 54,042, filed October 12, 1948, of Gillette et al., and may be here briefly described as follows.

The camera motor 19 rotates a disc 86 bearing a magnet 87 so that once each motion picture frame, immediately after the film pull-down, the magnet 87 passes a coil 88 and generates a potential pulse therein. This pulse is applied through conductor 89 to the electronic shutter 84. Television horizontal synchronizing pulses are also applied from the television receiver 11 through the conductor 91 to the electronic shutter 84. The output voltage of the electronic shutter controls an electrode of the cathode ray tube so as to control the illumination of the screen 13.

Figure 7:
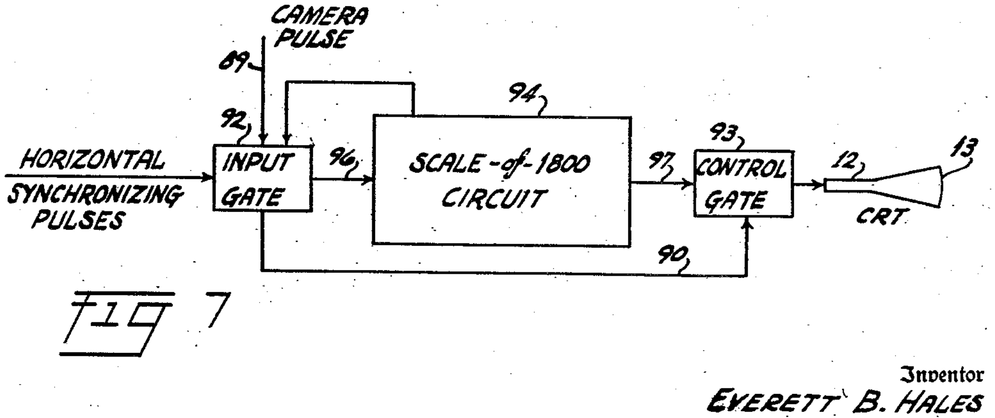
Figure 7 is a schematic illustration of an electronic shutter circuit used in connection with the circuit of Fig. 1.

The operation of the electronic shutter may be more easily understood by reference to Fig. 7 wherein horizontal synchronizing pulses are applied to an input gate circuit 92 but are not permitted to pass through until a camera pulse is received through conductor 89. The horizontal pulses are then permitted to pass in a steady stream. A signal is transmitted from the input gate circuit 92 to a control gate circuit 93 over conductor 96 at the instant of initiation of this stream of horizontal pulses, the function of which is to initiate an illumination of the cathode ray tube screen 13, the cathode ray tube 12 being under control of the control gate circuit. It is necessary to cause the tube 12 to remain illuminated for exactly 1800 horizontal synchronizing pulse periods so that exactly 1800 horizontal lines shall be scanned on the screen 13, constituting one full television picture composed of three successive color fields of 600 lines each. There is therefore provided a scale-of-1800 circuit 94, which is started by the application thereto of the stream of horizontal synchronizing pulses derived from the input gate circuit 92 through the conductor 96. The circuit 94 then counts exactly 1800 horizontal synchronizing pulses and emits a signal. This signal is transmitted through conductor 97 to the control gate 93, which thereupon terminates the illumination of the cathode ray tube 12. The scale-of-1800 circuit 94 also at the 1800th pulse restores the input gate 92 to its non-conductive condition. The circuit then remains quiescent until receipt of another camera pulse, when the operations described are repeated.

The time relationship of this cyclic operation is graphically illustrated in Fig. 2, in which the cathode ray tube illumination is shown as starting at the point 98, at the beginning of a red intensity field and persisting for $\frac{1}{40}$ second. The cathode ray tube then becomes dark until the time 99 is reached $\frac{1}{24}$ second after the beginning of the previous illumination, when another illumination period lasting for $\frac{1}{40}$ second commences. Although in this case the beginnings and terminations of the illumination periods coincide with the beginnings of field periods, this is by no means necessary. The illumination period can begin at any time, and the illumination cycle length need not be commensurable with the motion picture field period length.

It is, of course, apparent that the apparatus of this invention can be employed with any other type of sequential input signals. For instance, signals having horizontal line two-to-one interlace may be employed. In such a signal odd and even line color fields are alternated to produce line definition twice that of one field, while at the same time the color fields are transmitted in a repeated succession of red, green and blue fields. Alternatively dot interlaced signals may be employed, or signals having at the same time both dot interlace and line interlace.

While as described above the television signals have been assumed as made up of horizontal scanning lines and the lenticulations of the film as likewise horizontal, it will of course be obvious that other relationships are possible, for example the television signals may consist of vertical scanning lines or the film strip may be provided with longitudinal lenticulations, the invention not being restricted to the use of any particular type of television sequential color field signals, nor to any particular variety of lenticular film.

What is claimed is:

1. Color television recording apparatus comprising, a television receiver including a cathode ray tube on the screen of which there are displayed successive light image fields, the light intensities of which are representative of the respective intensities of different colors contained in the transmitted image, an intermittent mechanism, a lenticular film strip associated therewith and periodically advanced thereby, a lens system positioned to project the light images displayed on said cathode ray tube screen on said lenticular film strip, means for successively transmitting said light image fields through separate and distinct areas of said lens system, means for operating said light transmitting means in timed relation to the display of said successive light image fields and means for interrupting the transmission of light images during periodic advance of said film strip.

2. Color television recording apparatus comprising, a television receiver including a cathode ray tube on the screen of which there are displayed successive light image fields, the light intensities of which are representative of the respective intensities of different colors contained in the transmitted image, an intermittent mechanism, a lenticular film strip associated therewith and periodically advanced thereby, a lens system positioned to project the light images displayed on said cathode ray tube screen on said lenticular film strip, means operative in synchronism with the received television images for successively transmitting each of said light image fields representative of different colors through a separate and distinct transverse area of said lens system and means for interrupting the transmission of light images during periodic advance of said film strip.

3. Color television recording apparatus comprising, a television receiver including a cathode ray tube on the screen of which there are displayed successive light image fields in response to a received television signal composed of synchronizing signals and picture signals in the form of successive fields representing different basic colors contained in the original image, an intermittent mechanism, a lenticular film strip associated therewith and periodically advanced thereby, a lens system positioned to project the light images displayed on said cathode ray tube screen on said lenticular film strip, a movable mask positioned between said cathode ray tube screen and said lens system, said mask being provided with apertured means whereby the movement of the mask successively exposes different transverse areas of the lens system, means operative in accordance with received television synchronizing signals for controlling the movements of said mask so that each picture signal field representative of a different basic color is projected through said mask onto said lenticular film strip through a different one of said transverse areas of said lens system and means operative by received television synchronizing signals and said intermittent mechanism for preventing illumination of said lenticular film strip during movement of said film strip.

4. Color television recording apparatus comprising, a television receiver including a cathode ray tube on the screen of which there are displayed successive light image fields in response to a received television signal composed of synchronizing signals and picture signals in the form of successive fields representing different basic colors contained in the original image, an intermittent mechanism, a lenticular film strip associated therewith and periodically advanced thereby, a lens system positioned to project the light images displayed on said cathode ray tube screen on said lenticular film strip, a movable mask positioned between said cathode ray tube screen and said lens system, said mask being provided with light transmitting means in spaced areas thereof whereby movement of the mask successively exposes different transverse areas of the lens system, means operative in accordance with received television synchronizing signals for synchronizing the movement of said mask with the display of said picture signal fields so that each field representing a different basic color is projected by said light transmitting means onto said lenticular film strip through a different transverse area of said lens system, means operative by said intermittent mechanism for initiating illumination of said cathode ray tube screen and means operative by the horizontal television synchronizing signals for terminating illumination of said cathode ray tube screen after such number of horizontal lines have been received as to constitute such number of successive fields as are contained in one complete color television picture.

5. Color television recording apparatus comprising, a television receiver including a cathode ray tube on the screen of which are displayed successive light image fields each representative of one of three basic colors contained in the original image, an intermittent mechanism, a lenticular film strip associated therewith and periodically advanced thereby, a lens system positioned to project the light images displayed on said cathode ray tube screen on said lenticular film strip, a rotating mask positioned between said cathode ray tube screen and said lens system, said mask being provided with at least three apertures circumferentially and radially spaced from each other, means for rotating said mask in timed relation to the display of successive light image fields whereby the light field representative of each of said basic colors is projected onto said lenticular film strip through a different transverse area of said lens system and means for interrupting the projection of said light image fields during periodic advance of said film strip.

6. Color television recording apparatus comprising, a television receiver including a cathode ray tube on the screen of which are displayed successive light image fields each representative of one of the three basic colors contained in the original image, an intermittent mechanism, a lenticular film strip associated therewith and periodically advanced thereby, a lens system positioned to project the light images displayed on said cathode ray tube screen on said lenticular film strip, a rotating mask positioned between said cathode ray tube screen and said lens system, said mask being provided with at least three apertures circumferentially and radially spaced from each other, means for synchronizing the rotation of said mask with the received television signals so that each of said light image fields representative of a different basic color is projected through a different aperture and a different transverse area of said lens system and means for interrupting the projection of said light image fields during periodic advance of said film strip.

7. Color television recording apparatus comprising, a television receiver including a cathode ray tube on the screen of which are displayed successive light image fields each representative of one of the three basic colors in response to a received television signal composed of synchronizing signals and picture signals in the form of successive fields each representative of one of said basic colors, an intermittent mechanism, a lenticular film strip associated therewith and periodically advanced thereby, a lens system positioned to project the light images displayed on said cathode ray tube screen on said lenticular film strip, a rotating mask positioned between said cathode ray tube screen and said lens system, said mask being provided with at least three apertures circumferentially and radially spaced from each other, means operative in accordance with received television synchronizing signals for controlling the rotational speed of said mask so that each of said light image fields representative of a different color is projected through a different mask aperture and a different transverse area of said lens system, and means operative in accordance with reecived television synchronizing signals for interrupting the transmission of light to said lenticular film strip during the periods said lenticular film strip is advanced by said intermittent mechanish.

8. Color television recording apparatus comprising, a television receiver including a cathode ray tube on the screen of which are displayed successive light image fields each representative of one of the three basic colors in response to a received television signal composed of synchronizing signals and picture signals in the form of successive fields each representative of one of said basic colors, an intermittent mechanism, a lenticular film strip associated therewith and periodically advanced thereby, a lens system positioned to project the light images displayed on said cathode ray tube screen on said lenticular film strip, a rotating mask positioned between said cathode ray tube screen and said lens system, said mask being provided with at least three apertures circumferentially and radially spaced from each other, means operative in accordance with received television synchronizing signals for controlling the rotational speed of said mask so that each of said light image fields representative of a different color is projected through a different mask aperture and a different transverse area of said lens system, means operative by said intermittent mechanism for initiating the illumination of said cathode ray tube screen and means operative by the received horizontal synchronizing signals for terminating illumination of said cathode ray tube screen after such number of said synchronizing signals have been received as to constitute three successive television fields representative of the three basic colors.

9. Color television recording apparatus comprising, a television receiver including a cathode ray tube on the screen of which are displayed successive light image fields each representative of one of three basic colors contained in the original image, an intermittent mechanism, a lenticular film strip associated therewith and periodically advanced thereby, a lens system positioned to project the light images displayed on said cathode ray tube screen on said lenticular film strip, a rotating disc positioned between said cathode ray tube screen and said lens system, said disc being provided with at least three apertures formed concentric with the axis thereof, the arcuate extent of each aperture being slightly less than one third of the circumference and each being positioned at a different radial distance from the axis of the disc whereby the light field representative of each of said basic colors is projected onto said lenticular film strip through a different area of said lens system means for rotating said disc in timed relation to the display of successive light image fields, and means for interrupting the projection of said light image fields during periodic advance of said film strip.

10. Color television recording apparatus comprising, a television receiver including a cathode ray tube on the screen of which are displayed successive light image fields each representative of one of three basic colors contained in the original image, an intermittent mechanism, a lenticular film strip associated therewith and periodically advanced thereby, a lens system positioned to project the light images displayed on said cathode ray tube screen on said lenticular film strip, a rotating disc positioned between said cathode ray tube screen and said lens system, said disc being provided with at least three apertures formed concentric with the axis thereof, each extending for a distance of slightly less than one third the circumference and each being positioned at a different radial distance from the axis of the disc, means for synchronizing the rotation of said mask with the received television signal so that each of said light image fields representative of a different basic color is projected through a different aperture and hence a different area of said lens system and means for interrupting the projection of said light image fields during periodic advance of said film strip.

11. Color television recording apparatus comprising, a television receiver including a cathode ray tube on the screen of which are displayed successive light image fields each representative of one of the three basic colors in response to a received television signal composed of synchronizing signals and picture signals in the form of successive fields each representative of one of said basic colors, an intermittent mechanism, a lenticular film strip associated therewith and periodically advanced thereby, a lens system positioned to project the light images displayed on said cathode ray tube screen on said lenticular film strip, a rotating disc positioned between said cathode ray tube screen and said lens system, said disc being provided with at least three apertures formed concentric with the axis thereof, each extending for a distance of slightly less than one third the circumference and each being positioned at a different radial distance from the axis of the disc, means operative in accordance with received television synchronizing signals for controlling the rotational speed of said disc so that each of said light image fields representative of a different color is projected through a different area of said disc and different area of said lens system, and means operative in accordance with received television synchronizing signals for interrupting the transmission of light to said lenticular film strip during the periods said lenticular film strip is advanced by said intermittent mechanism.

12. Color television recording apparatus comprising, a television receiver including a cathode ray tube on the screen of which are displayed successive light image fields each representative of one of the three basic colors in response to a received television signal composed of synchronizing signals and picture signals in the form of successive fields each representative of one of said basic colors, an intermittent mechanism, a lenticular film strip associated therewith and periodically advanced thereby, a lens system positioned to project the light images displayed on said cathode ray tube screen on said lenticular film strip, a rotating disc positioned between said cathode ray tube screen and said lens system, said disc being provided with at least three apertures formed concentric with the axis thereof, each extending for a distance of slightly less than one third the circumference and each being positioned at a different radial distance from the axis of the disc, means operative in accordance with received television synchronizing signals for controlling the rotational speed of said disc so that each of said light image fields representative of a different color is projected through a different area of said disc and different area of said lens system, means operative by said intermittent mechanism for initiating the illumination of said cathode ray tube screen and means operative by the received horizontal synchronizing signals for terminating illumination of said cathode ray tube screen after such number of said synchronizing signals have been received as to constitute three successive television fields representative of the three basic colors.

EVERETT B. HALES.

REFERENCES CITED

The following references are of record in the file of this patent:

UNITED STATES PATENTS

| Number | Name | Date |
|---|---|---|
| 2,010,307 | Leishman | Aug. 6, 1935 |
| 2,319,789 | Chambers | May 25, 1943 |